Feb. 10, 1959 A. A. SIMPSON ET AL 2,872,790
REFRIGERATOR FOR USE IN CONNECTION WITH
ENGINES UTILIZING VOLATILE FUEL
Filed Feb. 8, 1956 5 Sheets-Sheet 1

INVENTORS
ARTHUR A. SIMPSON
& HERBERT H. DENMARK

BY *Holcomb, Wetherill & Brisebois*

ATTORNEYS

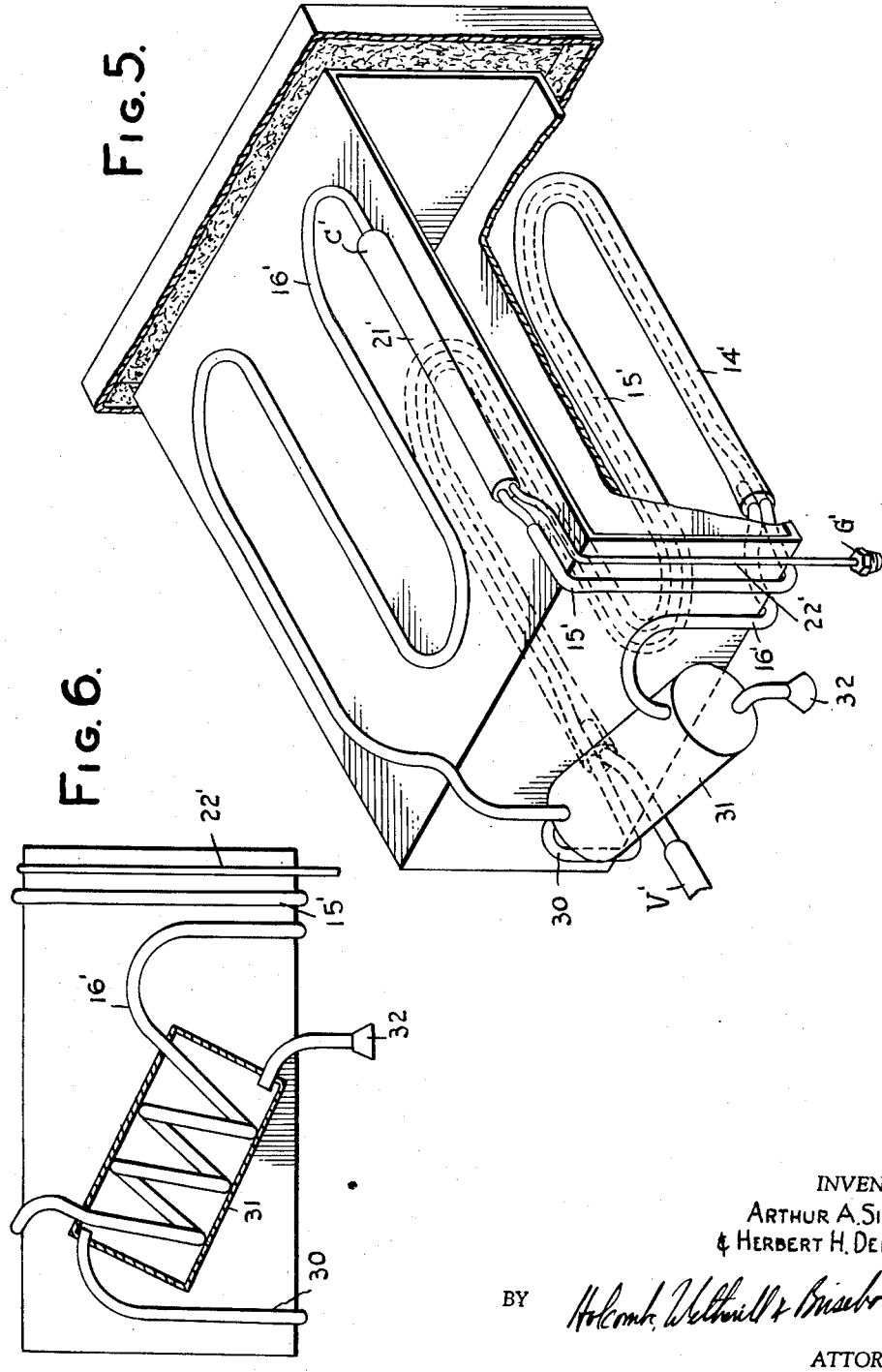

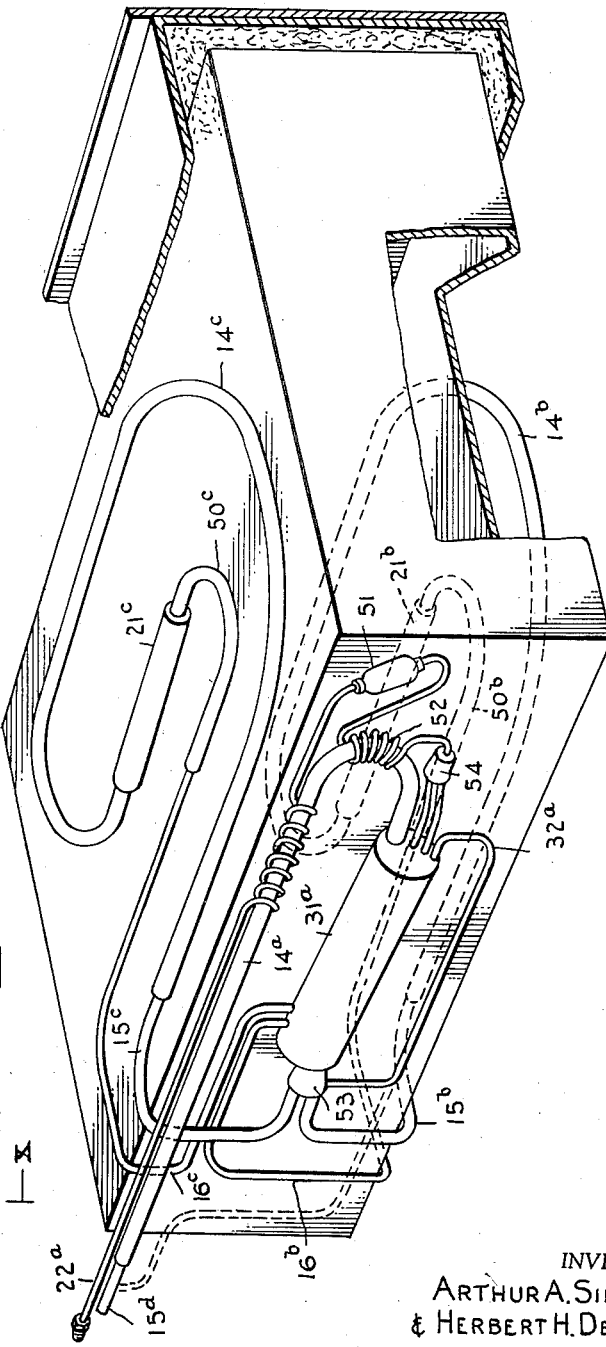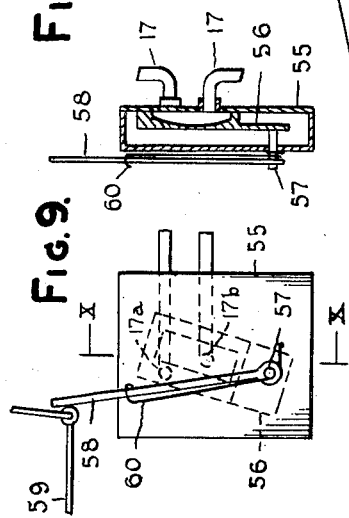

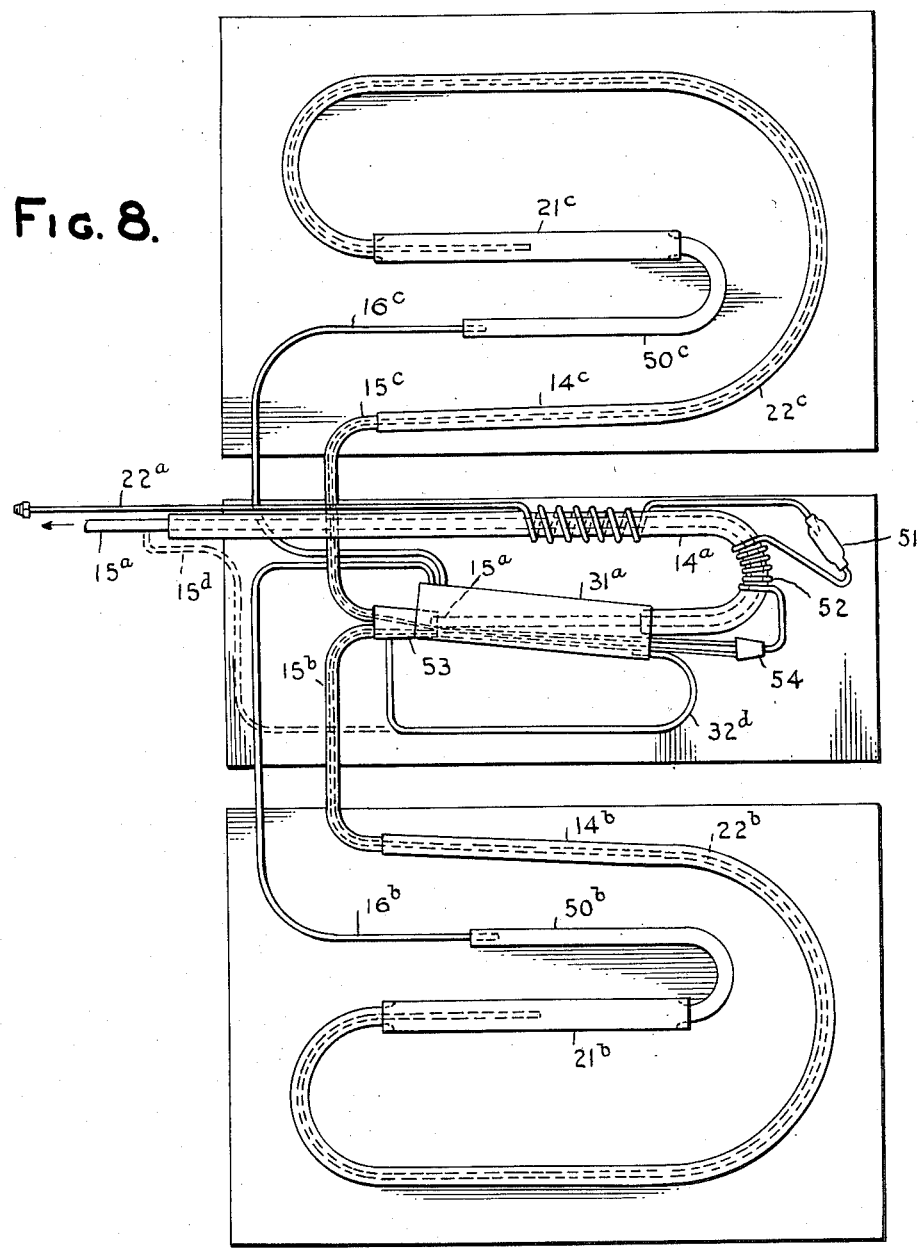

United States Patent Office 2,872,790
Patented Feb. 10, 1959

2,872,790

REFRIGERATOR FOR USE IN CONNECTION WITH ENGINES UTILIZING VOLATILE FUEL

Arthur A. Simpson and Herbert H. Denmark, New Orleans, La.

Application February 8, 1956, Serial No. 564,206

21 Claims. (Cl. 62—7)

Our invention relates to a compact refrigerator adapted to be readily installed in private passenger automobiles and cooled by vaporization of the fuel supplied to the automobile's motor. Several devices of this general type have been patented, but none are now believed to be in practical commercial use. As a rule these devices have failed to produce a sufficient reduction of temperature, have been subject to clogging of their tubing due to the formation of ice therein, and have required the installation of heat exchange coils beneath the hood in a complex manner precluding their distribution through stores specializing in the sale of automotive accessories for installation in automobiles subsequent to their shipment from the original manufacturer. The refrigerator may, of course, be operated in connection with gasoline engines not located in automobiles, or engines using other volatile fuels.

It is accordingly an object of our invention to provide a gasoline refrigerator which will make sufficiently efficient use of the cooling effect of vaporizing gasoline to bring the cabinet to be cooled to as low a temperature as necessary.

It is a further object of our invention to provide a refrigerator of this type in which the formation of ice in the tubing is reduced or controlled in such a way as to avoid interference with the effective operation of the refrigerator.

The final object of our invention is to provide a refrigerator which is so arranged that all of the essential elements thereof are mounted in or on the walls of the cabinet to be cooled, so that its installation requires only mounting of the cabinet beneath the dashboard and the connecting up of its vacuum and gas lines.

This application is a continuation-in-part of our application Serial No. 493,134, filed March 9, 1955.

Several embodiments of our invention are illustrated in the accompanying drawings in which:

Figure 5 is a perspective view of a second embodiment of our invention with the sides and insulating material of the cabinet broken away to show the tubing;

Figure 6 is an end view showing the casing of the dehumidifier broken away;

Figure 7 is a perspective view showing a third embodiment of our invention;

Figure 8 is a development showing the disposition of our refrigerating means in the three sides of the cabinet of Figure 7;

Figure 9 is a detail view showing a control valve which may be used to prevent our refrigerator from operating when the motor is idling; and Figure 10 is a cross-sectional view taken along the line X—X of Figure 9.

Like reference numerals denote like parts throughout the several views.

Figure 1:
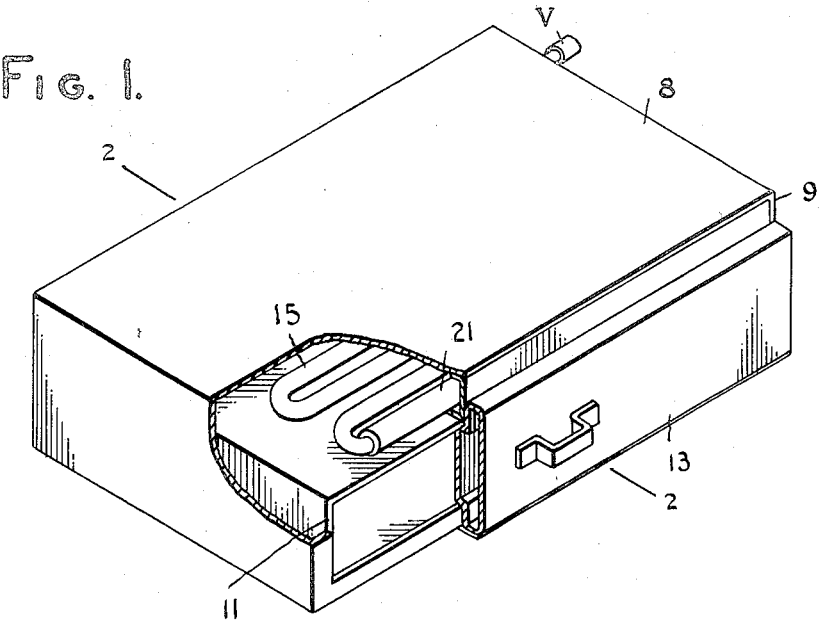
Figure 1 is a perspective view showing the exterior of a first embodiment of our refrigerator with one corner broken away.
Figure 2:
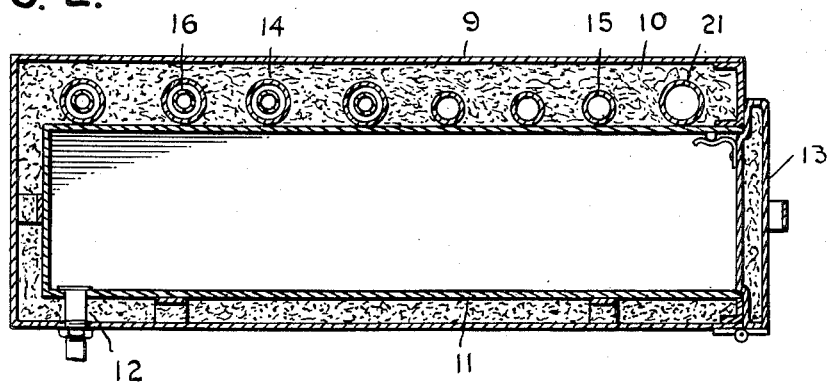
Figure 2 is a vertical cross-section taken along the line 2—2 of Figure 1.

Referring now to Figure 1, a refrigerated cabinet 8 comprises an outer metallic box 9, having a liner 10 of insulating material. Within this liner is a metallic inner box 11 drained by a pipe 12. Access to the interior is secured through a door 13. Between the top of this inner box and the insulating lining lies the refrigerating apparatus forming the subject matter of this invention.

Figure 3:
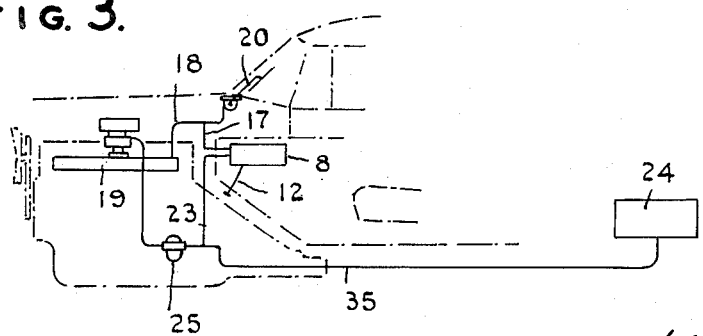
Figure 3 is a diagrammatic sketch showing how our refrigerator is mounted and connected in an automobile.
Figure 4:
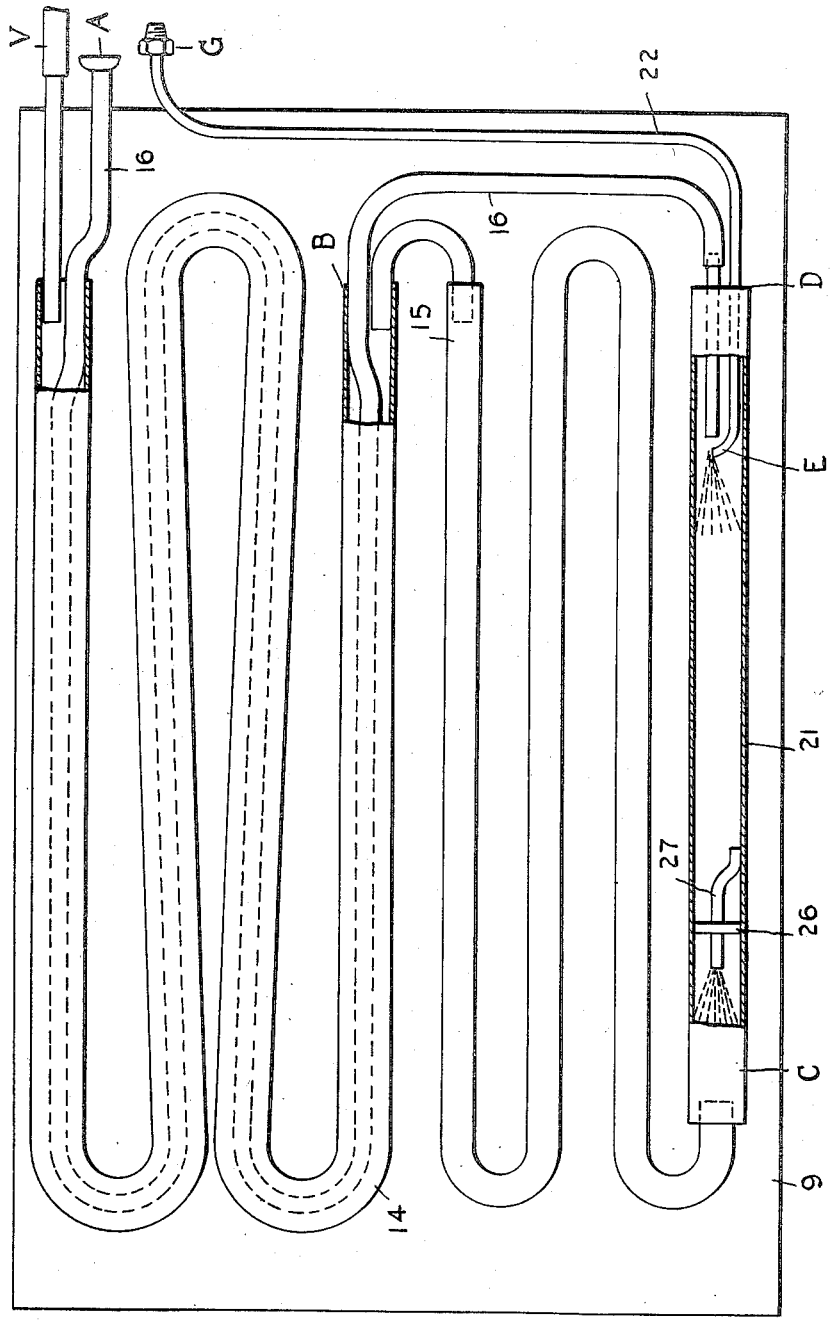
Figure 4 is a plan view showing the tubing of the first embodiment in place with the insulation removed.

As best seen in Figure 4, this apparatus comprises a heat exchange tube 14 which is connected at one end to vacuum tube 15 and encircles air intake tube 16. Heat exchange tube 14 is connected at V, by means of a length of flexible tubing 17 (Figure 3), to the vacuum line 18 leading from the intake manifold 19 of the motor to the windshield wiper 20, and consequently the fluid within it is under less than atmospheric pressure.

The tube 16 is open at A to atmospheric air and runs within heat exchange tube 14 until it emerges at B, from which point it leads directly to the inlet end D of a mixer tube 21. Vacuum tube 15 is bent into several cooling coils and runs from B to the outlet end C of the mixer tube 21. A fuel pipe 22 extends from a point E immediately in front of the mixer end of the air inlet tube 16 to a point G outside the cabinet, at which it is connected through a flexible tube 23 (Figure 3) to the fuel line 35 of the motor, between the fuel tank 24 and the fuel pump 25.

Between the point E and its outlet end C, the mixer tube 21 is divided by a wall 26 into two separate vaporizing compartments, connected by the tube 27 which extends through the wall 26.

For best results, the air inlet tube 16 and gasoline inlet tube 22 should be quite small, both having internal diameters of less than .125 inch, tube 16 being slightly the larger of the two. The internal diameter of the mixer should be about five times their combined diameters. Tube 27 should be larger than either 16 or 22 but have an internal diameter smaller than their combined diameters.

The operation of the device is as follows:

The suction from the intake manifold acts on the mixer tube 21, reducing the pressure therein and consequently draws atmospheric air through the tube 16 and gasoline from the fuel line 35 through tubes 22 and 23. When these arrive at the point E, the gasoline reaches a tube of larger area at relatively lower pressure. It consequently expands and partially vaporizes, thus lowering the temperature of the mixture of air and gasoline of which it forms a part. This mixture is then drawn through the tube 27 and at its outlet end reaches an area of still lower pressure, again expanding and cooling. This is the coldest point in the system. If any ice forms, it will form here and, if it forms in quantity, it will block the tube 27 and consequently stop the entire system from operating. This will result in a warmer temperature at the outlet of tube 27 and melting of the ice, followed by a resumption of operation. The mixture is then carried into the adjacent coils of the tube 15 and cools the cabinet as it travels through them. Thence it passes into the heat exchange tube 14, and cools the incoming air in the concentric tube 16. Finally it passes out at V and into the intake manifold to serve as part of the fuel consumed by the motor.

If desired, our refrigerator may be modified to incorporate a drier for the incoming air in order to reduce stoppages due to icing at the vaporizer. This is accomplished by leading the incoming air past an intermediate stretch of the vacuum tube before it enters the heat exchange tube.

This arrangement is shown in Figures 5 and 6.

A mixer 21' is connected at one end C' to the cooling coil of a vacuum tube 15' which passes through the cylinder 31 to the heat exchange tube 14' which is in turn connected at V' to the vacuum line of the automobile. The other end of the mixer is connected to a gasoline intake pipe 22' connected to the gas line at G', and to an air intake tube 16' which passes through the heat exchanger tube 14' and terminates at 30 in the cylinder 31. This cylinder has a combination air inlet and drain 32. Several loops of the vacuum cooling coil 15' are positioned within the cylinder 31 and as the incoming air strikes these cool loops, water is condensed therefrom and drains through the outlet 32, thus dehymidifying the air and reducing the danger that ice will form when the mixture passes into the cooling coil from the mixer.

The operation is otherwise the same as in the embodiment of Figure 1. Suction through the vacuum tube 15' reduces the pressure in the mixer 21', of the same type as mixer 21. Air is consequently drawn in through 32, 31, 30 and 16' while gasoline is drawn in through 22'. These vaporize in the two-compartment mixer 21', cool the cabinet as they travel through the coil 15', and then pass through heat exchanger 14' and outlet V' to the intake manifold of the automobile.

The embodiments of our invention already described are adequate for cool, dry climates, but where more vigorous cooling is required, and the air is very humid, the embodiment shown in Figures 7 and 8 is more satisfactory. As shown in these figures, heat exchange tube 14a lies at the back of the box and serves as an air inlet which conducts incoming air into the drier 31a. Vacuum tube 15a is connected at one end to the vacuum line of the automobile and runs through heat exchange tube 14a, through the drier 31a, and then divides into two subsidiary vacuum tubes 15b and 15c which terminate in secondary heat exchange tubes 14b and 14c, respectively. The other ends of the heat exchange tubes 14b and 14c are connected to mixer tubes 21b and 21c respectively, which are in turn connected to intermediate tubes 50b and 50c which receive air intake tubes 16b and 16c, respectively. These air intake tubes terminate in the drier 31a. Vaporizable fuel is brought into the system through gasoline intake tube 22a which may be coiled about heat exchange tube 14a. The gasoline intake tube leads the fuel through a filter 51 and may then be immediately divided into subsidiary gasoline intake tubes 22b and 22c, or may first be wound into a tight coil 52, which may or may not be wound about the heat exchange tube 14a. The subsidiary gasoline intake tubes 22b and 22c then run through the drier 31a and pass out through the subsidiary vacuum tubes 15b and 15c, continue through heat exchange tubes 14b and 14c and terminate approximately midway of the mixer tubes 21b and 21c, respectively.

In operation, suction through the vacuum tubes 15a, 15b and 15c reduces the pressure in the mixers 21b and 21c. This draws air through the heat exchange tube 14a into the drier 31a and thence through air intake tubes 16b and 16c and intermediate tubes 50b and 50c into one end of the mixer, while simultaneously drawing gasoline through the capillary gasoline intake tubes 22a, 22b and 22c into the midportion of the mixers, at which point the gasoline expands and vaporizes, to form a cooling mixture with the incoming air. This mixture is drawn first through the heat exchange tubes 14b and 14c which lie close against the inner walls of the refrigerator to cool its contents, while simultaneously cooling the incoming gasoline in the tubes 22b and 22c. The cool mixture is then drawn through vacuum tubes 15b and 15c into vacuum tube 15a which tube extends through the drier 31a and thence through heat exchange tube 14a and out to the vacuum line of the automobile. Since the tube 15a contains a cold mixture, its walls are cold and serve to precool the air coming in through the heat exchange tube 14a. The moisture in this air therefore condenses out on the tube 15a and drips to the bottom of the drier 31a, from which point it runs out through the drain 32a which leads to the vacuum tube 15a. If the refrigerator coils need not be operated at very low temperatures the drain may be connected to the vacuum tube 15a by terminating it in the T 53 which connects tube 15a to subsidiary tubes 15b and 15c. If, however, operation at very low temperatures is required, the drain should enter the vacuum line only after it has left the heat exchange tube, as indicated in dotted lines, since the T 53 is then likely to be quite cold and the introduction of moisture at that point will lead to the formation of ice under those circumstances. It will be appreciated that the cold mixture leaving through the vacuum tube 15a serves to cool the incoming air in the heat exchange tube 14a, and the incoming gasoline in the gasoline intake tube 22a, especially if the coil 52 is wrapped about the heat exchange tube. This is important in hot, humid climates, since otherwise the gasoline which is under subatmospheric pressure in the gasoline intake tube may vaporize before it reaches the mixers. The special function of this coil 52, however, is to reduce the volume of gasoline reaching the mixers at any given moment. If the diameter of the gasoline intake tube were made small enough to produce the proper mixture of fuel and air without slowing the feeding of the incoming gasoline by means of the coil 52, this tube would be so small that it would clog up easily and therefore present serious maintenance problems. The coil 52 permits the use of a gasoline intake tube having an inner diameter of approximately .031 inch which is sufficiently large to avoid any substantial danger of clogging, since the fuel has already been strained in the strainer 51. The T 54 is simply a convenient means for dividing the gasoline intake tube into its two branches 22b and 22c, but the T 53, by extending into the drier 31a, provides a substantial cooling surface on the exterior of the portion lying within the drier and avoids the necessity for providing a plurality of small air-tight connections in the outlet end of the drier. These connections are usually soldered and when there are several quite close together the heating necessary to complete a second connection is likely to melt an adjacent first connection which has already been completed.

The comparatively warm gasoline inlet tubes 22b and 22c tend, as they pass through the drier, to prevent water dripping off the vacuum tube 15a, from freezing in the bottom of the drier.

The intermediate tubes 50b and 50c have an inner diameter of about .315 inch as compared to the .065 inch of the air inlet tubes 16b and 16c, but are slightly smaller than the mixers 50b and 50c which have an inner diameter of .440 inch. It has been found that in humid climates there is still some moisture in the air entering the mixers, and that if it enters the mixers through small tubes directly opposite the gasoline inlets the vaporizing gasoline will, if the device is operated for some time, cause enough ice to form at the end of such small air inlet tubes to block them up. The use of the larger intermediate tubes 50b and 50c prevents this.

The proportions indicated by the internal diameters given for the various tubes is of some importance, since they are designed to produce the proper mixture of gasoline and air while simultaneously avoiding clogging due to icing. It is ordinarily desirable to render our device inoperative while the motor is idling. This may be easily accomplished by inserting a valve in the tubing 17 connecting the vacuum tube 15a of the refrigerator to the vacuum line of the automobile which is responsive to pressure on the gas pedal or accelerator of the automobile, so that pressure on the pedal opens the vacuum pipe to permit operation of the refrigerator but the valve automatically blocks the tubing 17 when there is no pressure on the pedal. Representative means for accomplishing this are shown in Figure 9.

In this figure both the portion of the vacuum tubing 17 which is connected to the vacuum tube 22a of the refrigerator and the portion connected to the vacuum line 18 of the automobile terminate at 17a and 17b in a flat plate 55. A concave valve member 56 is pivotally mounted at 57 so as to be slidably movable across the face of plate 55. The marginal portions of the valve member are flush with the face of plate 55, whereas its central portion is concave.

When the valve member 56 is in the position shown in Figure 9, the opening 17a and consequently the tubing 17 are closed off by the marginal portion of the valve member. It is normally held in this position by the lever 58 which bears against the hinge at the rear end of the rod 59 which is the longest link connecting the accelerator pedal to the carburetor, or against any suitable stop member fixed to this rod. When the accelerator pedal is pushed down, the rod 59 is pushed forward permitting the spring 60 to force the lever 58 forward, thus turning the valve member 56 to the left of the figure, so that there is a free passage from 17a to 17b through the concave portion of the valve member 56.

While our invention has been described in connection with a gasoline powered automobile in order to present a specific example showing its mode of operation in detail, it will be appreciated that it can be operated in connection with a gasoline engine regardless of the location of the engine, which may be in a boat, or completely stationary. It may also be operated, when suitably adjusted, with volatile fuels other than gasoline.

We claim:

1. A refrigerated cabinet for installation in connection with an engine utilizing a volatile fuel and provided with a fuel feed line and a vacuum line connected to its intake manifold, said cabinet comprising an inner box, at least one cooling coil adjacent at least one wall thereof and in heat exchange relationship therewith, and insulating material surrounding said box and coil, said coil including a mixer tube and means for maintaining a gaseous atmosphere therein comprising an air intake tube open at one end to the atmosphere, a fuel intake tube adapted to be connected at one end to said feed line, and a vacuum tube adapted to be connected at one end to said vacuum line, said vacuum and air intake tubes being smaller than said mixer tube and connected at their other ends to said mixer tube at points spaced axially therealong, said fuel intake tube terminating in said mixer tube between the connections of said vacuum and air intake tubes to said mixer tube and downstream of said air intake tube, said mixer tube being otherwise completely closed so that when suction is applied to said vacuum tube both air and fuel are drawn into said mixer tube through said air and fuel intake tubes respectively and produce a reduction in temperature in said mixer tube through vaporization of said fuel, and said vaporizable fuel is drawn away from said air intake tube to avoid icing thereat.

2. A refrigerating cabinet as claimed in claim 1 in which said mixer tube is divided into two vaporizing compartments communicating with each other through a relatively small aperture.

3. A refrigerating cabinet as claimed in claim 2 in which said aperture is formed by a short section of tubing.

4. A refrigerating cabinet as claimed in claim 3 in which said air intake tube parallels a substantial length of said vacuum tube before terminating in said mixer tube, so that the incoming air is cooled before reaching said mixer tube.

5. A refrigerating cabinet as claimed in claim 4 in which said air intake and vacuum tube are so positioned relative to each other that the air in said air intake coil is traveling in a direction opposite to that of the mixture in said suction coil where these two coils are parallel.

6. A refrigerating cabinet as claimed in claim 5 in which said incoming air is brought into heat exchange relationship with an intermediate stretch of said vacuum tube before paralleling the portion thereof furtherest from said mixer.

7. A refrigerating cabinet as claimed in claim 1 in which the inner diameter of said mixer tube is at least ten times that of said air intake tube, and said gasoline intake tube has a smaller inner diameter than said air intake tube.

8. A refrigerating cabinet as claimed in claim 1 in which the mixer end of said gasoline intake tube terminates just beyond and approximately in line with the mixer end of said air intake tube so that air flowing from said air intake tube has an aspirating effect on the contents of said gasoline intake tube.

9. A refrigerating cabinet as claimed in claim 1 in which a portion of said vacuum tube is enclosed within a container provided with a drain and the inlet end of said air intake tube is connected to said container so as to draw therefrom air which has been brought into heat exchange relationship with said portion of said vacuum tube so as to cool said air and consequently cause a portion of the moisture therein to condense out thereof and precipitate itself within said container.

10. A refrigerating cabinet as claimed in claim 1 in which said incoming air is brought into heat exchange relationship with said vacuum tube before it reaches said mixer tube.

11. A refrigerating cabinet as claimed in claim 1 in which said incoming air is led into a container encircling said vacuum tube before it reaches said mixer tube, said container being provided with a drain, so that moisture condensing out of the air on said vacuum tube will run out of the container.

12. A refrigerating cabinet as claimed in claim 11 in which said drain is connected to said vacuum tube.

13. A refrigerating cabinet as claimed in claim 1 in which said fuel intake tube runs inside said vacuum tube so that the fuel therein is cooled before it reaches the mixer tube.

14. A refrigerating cabinet for use in conjunction with an engine utilizing a volatile fuel and provided with a fuel feed line and a vacuum line connected to its intake manifold, said cabinet comprising an inner box, a primary heat exchange tube open at one end to the atmosphere and at the other into a container serving as a drier, a vacuum tube adapted to be connected at one end to said vacuum line which extends in heat exchange relationship with said primary heat exchange tube through said drier, and then divides into two branches, each of which terminates at one end of a secondary heat exchange tube which is in heat exchange relationship with a wall of said inner box, a mixer tube attached at one end to the other end of each secondary heat exchange tube, a fuel intake tube adapted to be connected at one end to said fuel feed line which extends along in heat exchange relationship with said primary heat exchange tube and then divides into two branches, one of which extends in heat exchange relationship along with each vacuum tube and each secondary heat exchange tube into each mixer tube and opens into said mixer tube intermediate the ends thereof, and air intake means connecting the other end of each mixer tube to said drier, said mixer tube being larger in diameter than said intake tubes so that fuel drawn thereinto by the lower pressure in said vacuum tubes expands and vaporizes within said mixer tube, forming with said air a cooling mixture which is drawn out through said secondary heat exchange tubes to cool said box, through said drier, where it cools and condenses moisture from the incoming air, and thence to said engine.

15. A refrigerating cabinet as claimed in claim 14 in which a portion of said fuel intake tube is tightly coiled so as to slow the flow of fuel to the mixers.

16. A refrigerating cabinet as claimed in claim 14 in which the diameter of each of the air intake tubes is much smaller than that of the mixer tube with which it is associated and it is connected thereto by means of an intermediate tube having a diameter much greater than that of the air inlet tube but less than that of the mixer tube in order to avoid icing at the outlet of the air intake tube.

17. A refrigerating cabinet as claimed in claim 14 for use with an engine having a carburetor and carburetor control means comprising a valve which closes the connection between said vacuum tube and vacuum line in response to the position of said carburetor control means.

18. A refrigerating cabinet as claimed in claim 14 in which said vacuum lines run inside said primary heat exchange tube and said fuel intake tube branches run inside said vacuum tube branches and said secondary heat exchange tubes into said mixer tube.

19. A refrigerated cabinet for installation in connection with an engine utilizing a volatile fuel and provided with a fuel feed line and a vacuum line connected to its intake manifold, said cabinet comprising an inner box, at least one cooling coil adjacent at least one wall thereof and in heat exchange relationship therewith, and insulating material surrounding said box and coil, said coil including a mixer tube and means for maintaining a gaseous atmosphere therein comprising an air intake tube open at one end to the atmosphere, a fuel intake tube adapted to be connected at one end to said feed line, and a vacuum tube adapted to be connected at one end to said vacuum line, said vacuum and air intake tubes being smaller than said mixer tube and being connected at their other ends to said mixer tube at axially spaced points therealong, and said fuel intake tube terminating in said mixer tube between the connections of said vacuum and air intake tubes to said mixer tube and downstream of said air intake tube, said mixer tube being otherwise completely closed so that when suction is applied to said vacuum tube both air and fuel are drawn into said mixer tube through said air and fuel intake tubes respectively and produce a reduction in temperature in said mixer tube through vaporization of said fuel, and said vaporizable fuel is drawn away from said air intake tube connection to prevent icing thereat, both said fuel and air intake tubes being positioned in heat exchange relationship with said vacuum tube for at least a portion of their lengths.

20. A refrigerating cabinet as claimed in claim 19 in which the diameter of the air intake tube is much smaller than that of the mixer tube and it is connected thereto by means of a U-shaped intermediate tube having a diameter greater than that of the air inlet tube but less than that of the mixer tube in order to avoid icing at the outlet of the air intake tube.

21. A refrigerating cabinet as claimed in claim 1 provided with a plurality of the cooling coils described therein.

References Cited in the file of this patent

UNITED STATES PATENTS

| | | |
|---|---|---|
| 2,438,594 | Zapart | Mar. 30, 1948 |
| 2,517,156 | Zapart | Aug. 1, 1950 |
| 2,755,639 | Straznicky | July 24, 1956 |